US012481054B2

(12) United States Patent
Benedetto et al.

(10) Patent No.: US 12,481,054 B2
(45) Date of Patent: Nov. 25, 2025

(54) METHOD AND SYSTEM FOR ESTIMATING AN OCCUPANCY LEVEL OF A GEOGRAPHIC AREA

(71) Applicant: TELECOM ITALIA S.p.A., Milan (IT)

(72) Inventors: Andrea Benedetto, Turin (IT); Roberto Lanzo, Turin (IT); Simone Piacco, Turin (IT); Andrea Schiavoni, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 347 days.

(21) Appl. No.: 18/004,207

(22) PCT Filed: Jul. 12, 2021

(86) PCT No.: PCT/EP2021/069273
§ 371 (c)(1),
(2) Date: Jan. 4, 2023

(87) PCT Pub. No.: WO2022/013128
PCT Pub. Date: Jan. 20, 2022

(65) Prior Publication Data
US 2023/0266462 A1    Aug. 24, 2023

(30) Foreign Application Priority Data

Jul. 16, 2020 (IT) .................. 102020000017323

(51) Int. Cl.
*G01S 13/89* (2006.01)
*G01S 13/52* (2006.01)
*H04W 64/00* (2009.01)

(52) U.S. Cl.
CPC .............. *G01S 13/89* (2013.01); *G01S 13/52* (2013.01); *H04W 64/00* (2013.01)

(58) Field of Classification Search
CPC .......... G01S 13/89; G01S 13/52; G01S 7/006; G01S 13/284; G01S 13/42; G01S 13/524;
(Continued)

(56) References Cited

U.S. PATENT DOCUMENTS 10,175,340 B1    1/2019 Abari et al.
10,205,457 B1    2/2019 Josefsberg et al.
(Continued)

FOREIGN PATENT DOCUMENTS

CN           102017532 A  *  4/2011  ........ H04W 52/0206
WO      WO 2014/125447 A1     8/2014

OTHER PUBLICATIONS

International Search Report & Written Opinion, issued Oct. 13, 2021 in PCT/EP2021/069273, filed on Jul. 12, 2021, 17 pages.

*Primary Examiner* — Olumide Ajibade Akonai
*Assistant Examiner* — Bongani Jabulani Mashele
(74) *Attorney, Agent, or Firm* — Oblon, McClelland, Maier & Neustadt, L.L.P.

(57) ABSTRACT

A method for estimating an occupancy level of a geographic area includes transmitting first signals to and receiving second signals from bodies within the geographic area by backscattering of the first signals. The bodies include first bodies permanently within the geographic area and second bodies temporarily within the geographic area. According to the first and second signals, a first map of the first bodies within the geographic area is generated. At a specified time period, following a reference time period, transmission of the first signals, reception of the radio signals and generation of the first map is repeated. According to the first and second signals, a second map of the bodies within the geographic area is generated. A number of the second bodies within the (Continued)

geographic area during the specified time period is determined as the occupancy level based on comparing the first map to the second map.

9 Claims, 7 Drawing Sheets

(58) Field of Classification Search
CPC ...... G01S 13/538; G01S 13/56; G01S 13/582; G01S 7/415; H04W 64/00; H04W 88/08; H04W 24/08

See application file for complete search history.

(56) References Cited

U.S. PATENT DOCUMENTS

| | | | |
|---|---|---|---|
| 2016/0213258 A1* | 7/2016 | Lashkari | G01S 15/8915 |
| 2016/0294056 A1* | 10/2016 | Manteghi | H04L 27/12 |
| 2019/0331764 A1 | 10/2019 | Abari et al. | |
| 2020/0049511 A1* | 2/2020 | Sithiravel | G01S 13/865 |
| 2020/0064784 A1* | 2/2020 | Steiner | G01S 13/68 |
| 2021/0156952 A1 | 5/2021 | Abari et al. | |

\* cited by examiner

METHOD AND SYSTEM FOR ESTIMATING AN OCCUPANCY LEVEL OF A GEOGRAPHIC AREA

BACKGROUND OF THE INVENTION

Field of the Invention

The present invention generally relates to a mobile communication network. Particularly, the present invention relates to a method and system for estimating an occupancy level of a geographic area served by a mobile communication network, i.e. a level of presence of bodies (including living beings and inanimate objects) within a geographic area served by the mobile communication network.

Overview of the Related Art

Estimating the occupancy level of a geographic area served by a mobile communication network may be useful for network management purposes (e.g., in order to take actions on data traffic steering and traffic load balancing on different layers of the mobile communication network, so as to drift the traffic load toward base transceiver stations with lower traffic loads), for public safety purposes (e.g., in order to manage over crowded or alarm situations) and/or for network dimensioning purposes (e.g., in order to take actions aimed at optimizing performances of the mobile communication network).

WO2015/051814 discloses methods and apparatuses for providing information for use in determining a data map of objects. Measurement information is provided by a receiver associated with a mobile communication system for objects in an area based on signals from transmitters with known positions. The measurement information is received at a central unit from the receiver and possibly also from at least one further receiver associated with the mobile communication system. A data map of objects in the area is then provided based at least in part on the received measurement information.

GB2481851 discloses a method and device for dynamically altering the signal-space-to-physical-space mapping database of a set of access points for use in localizing of an object, by obtaining a location profile for the object and obtaining an estimated location of an object by measuring the signal parameter induced by at least one access point and using the signal-space-to-physical-space mapping database for deriving an estimated location from the measured signal parameter, and determining whether the obtained estimated location complies with the obtained location profile for the object. If the obtained estimated location does not comply with the location profile, the mapping database is dynamically adjusted to obtain an adjusted signal-space-to-physical-space mapping database based on a difference between the measured signal parameter and the signal parameter corresponding with the signal space for the location expected based on the location profile.

Thomä et al., "*Cooperative Passive Coherent Location: A Promising 5G Service to Support Road Safety*", IEEE Communications Magazine, September 2019, discloses a CPCL (cooperative passive coherent location), a distributed MIMO radar service, which can be offered by mobile radio network operators as a service for public user groups. CPCL comes as an inherent part of the radio network and takes advantage of the most important key features proposed for 5G. It extends the well-known idea of passive radar (also known as passive coherent location, PCL) by introducing cooperative principles. These range from cooperative, synchronous radio signaling, and MAC up to radar data fusion on sensor and scenario levels. By using software-defined radio and network paradigms, as well as real-time mobile edge computing facilities intended for 5G, CPCL promises to become a ubiquitous radar service which may be adaptive, reconfigurable, and cognitive.

Solomitckii et al., "*Technologies for Efficient Amateur Drone Detection in 5G Millimeter-Wave Cellular Infrastructure*", IEEE Communications Magazine, January 2018, discloses to exploit 5G millimeter-wave deployments to detect violating amateur drones. The prospective 5G infrastructure may provide all the necessary technology elements to support efficient detection of small-sized drones. A novel technology and system design perspective is outlined, including such considerations as the density of base stations, their directional antennas, and the available bandwidth, among others, as well as characterize their impact with the ray-based modeling methods.

WO2017054856, in the name of the same Applicant, discloses a method for managing a wireless network wherein an extrapolation technique is used to estimate a possible presence of people within a geographic area based on historical traffic data of the base transceiver station covering the geographic area, and on analysis and correlation of events external to the base transceiver station (such as music events, fairs, sport events).

SUMMARY OF INVENTION

The Applicant has found that none of the solutions known in the art is satisfactory.

Concerning the solutions disclosed in WO2015/051814, in GB2481851 and in Thoma work, the Applicant has understood that they are based on the common approach of measuring a number of users registered on the mobile communication network of a specific network operator according to SIM-based techniques (such as analysis of a number of connected users or a traffic level performed by active users within the geographic area covered by the mobile communication network), and that therefore such solutions are limited to the customers of that specific network operator.

As far as the solutions based on extrapolation techniques are concerned, such as the solution disclosed in WO2017054856, according to the Applicant these solutions as well can be applied only to the customers of that specific network operator.

In addition, the solutions disclosed in WO2015/051814, in GB2481851, in Thomä work, and in WO2017054856 are limited to estimates or measurements of a number of persons, and therefore do not take into account the occupancy level, i.e. the level of presence of bodies in the practical case in which the bodies include both living beings other than persons, and inanimate objects, whereas the solution disclosed in Solomitckii work is limited to drone detection, and therefore does not take into account the level of presence of bodies in the practical case in which the bodies include also living beings.

In this respect, the Applicant has faced the above-mentioned issues, and has devised a method and system for estimating the occupancy level of a geographic area served by a mobile communication network, wherein the occupancy level takes into account the level of presence of bodies in the practical case in which the bodies include persons, living beings other than persons, and inanimate objects, and wherein the estimate of the occupancy level of the geographic area is substantially independent from the network operator to which the persons have subscribed as users.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for estimating, at a specified time period, an occupancy level of a geographic area served by a mobile communication network. The mobile communication network may comprise a base transceiver station providing radio coverage over the geographic area. The method may comprise, during a reference time period:
 a) causing the base transceiver station to transmit first radio signals over the geographic area, and to receive corresponding second radio signals originated from a plurality of bodies within the geographic area by backscattering of the first radio signals hitting the plurality of bodies. The plurality of bodies may comprise first bodies whose presence within the geographic area is permanent and second bodies whose presence within the geographic area is temporary;
 b) according to the first and second radio signals, generating a first map of the first bodies within the geographic area;

The method may comprise, at the specified time period, following in time the reference time period:
 c) performing step a);
 d) according to the first and second radio signals, generating a second map of the plurality of bodies within the geographic area;
 e) according to a comparison between the first and second maps, determining a number of the second bodies within the geographic area during the specified time period, said number of second bodies representing said occupancy level.

According to an embodiment, whose features are additional or alternative to any features of the previous embodiments, during the reference time period, the method may further comprise, e.g. after step a), identifying, among the second radio signals, the second radio signals originated from the second bodies. Step b) may be performed by discarding the second radio signals originated from the second bodies.

According to an embodiment, whose features are additional or alternative to any features of the previous embodiments, said identifying, among the second radio signals, the second radio signals originated from the second bodies may be based on a detection of a Doppler shift between the second radio signals and the respective first radio signals.

According to an embodiment, whose features are additional or alternative to any features of the previous embodiments, steps b) and d) may be performed based on a time delay between transmission of the first radio signals and reception of the corresponding second radio signals.

According to an embodiment, whose features are additional or alternative to any features of the previous embodiments, at least one of the Doppler shift and the time delay may be determined based on a cross correlation between the second signals and the respective first signals.

According to an embodiment, whose features are additional or alternative to any features of the previous embodiments, each of the first radio signals comprises a perfect autocorrelation sequence of electromagnetic pulses or an almost perfect autocorrelation sequence of electromagnetic pulses.

According to an embodiment, whose features are additional or alternative to any features of the previous embodiments, the method may further comprise, during the reference time period, repeating steps a) and b), and at each current repetition, e.g. after step b), removing from the first map generated in the current repetition any first bodies that were not present in the first map generated at a previous repetition before the current repetition.

According to an embodiment, whose features are additional or alternative to any features of the previous embodiments, the base transceiver station comprises a time variant active antenna.

According to an embodiment, whose features are additional or alternative to any features of the previous embodiments, the method may further comprise determining the reference time period as a time period wherein data traffic within the geographic area is below a data traffic threshold according to at least one among:
 one or more assumptions about the geographic area and/or uses thereof;
 base transceiver station activity counters, and
 base transceiver station activity estimates.

Another aspect of the present invention relates to a system for estimating, at a specified time period, an occupancy level of a geographic area served by a mobile communication network. The mobile communication network may comprise a base transceiver station providing radio coverage over the geographic area. The system may comprise an estimate module configured to, during a reference time period:
 a) cause the base transceiver station to transmit first radio signals over the geographic area, and to receive corresponding second radio signals originated from a plurality of bodies within the geographic area by backscattering of the first radio signals hitting the plurality of bodies. The plurality of bodies may comprise first bodies whose presence within the geographic area is permanent and second bodies whose presence within the geographic area is temporary;
 b) according to the first and second radio signals, generate a first map of the first bodies within the geographic area;

The estimate module may be configured to, at the specified time period, following in time the reference time period:
 c) perform step a);
 d) according to the first and second radio signals, generate a second map of the plurality of bodies within the geographic area, and
 e) according to a comparison between the first and second maps, determine a number of the second bodies within the geographic area during the specified time period, said number of second bodies representing said occupancy level.

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein.

DETAILED DESCRIPTION OF PREFERRED EMBODIMENTS OF THE INVENTION

Figure 1:
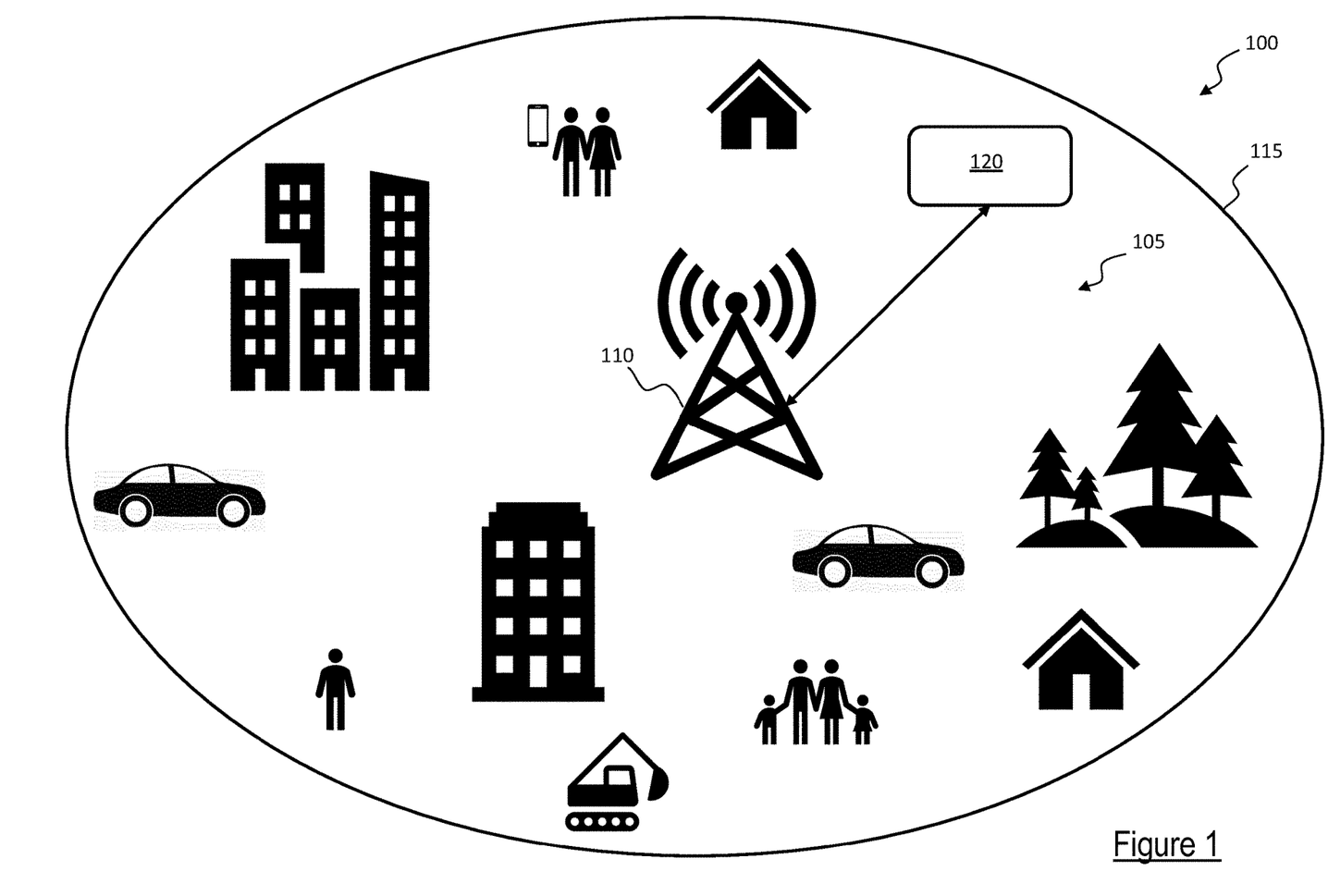
FIG. 1 schematically shows a system according to an embodiment of the present invention.

FIG. 1 schematically shows a system 100 (i.e., a portion thereof) according to an embodiment of the present invention.

In the following, when one or more features of the system (as well as of components thereof and/or method steps implemented by it) are introduced by the wording "according to an embodiment", they are to be construed as features additional or alternative to any features previously introduced, unless otherwise indicated and/or unless there is evident incompatibility among feature combinations.

In the following, only relevant features of the system that are deemed pertinent for the understanding of the present invention will be discussed, with well-known and/or obvious variants of the relevant features that are omitted for the sake of conciseness.

According to an embodiment, the system 100 comprises a mobile communication network 105.

The mobile communication network 105 may be based on any suitable radio access technology. Examples of radio access technologies comprise UTRA ("UMTS Terrestrial Radio Access"), WCDMA ("Wideband Code Division Multiple Access"), CDMA2000, GERAN ("GSM EDGE Radio Access Network"), LTE ("Long Term Evolution"), LTE-Advanced, and NR ("New Radio").

According to an embodiment, the mobile communication network 105 comprises one or more base transceiver stations (hereinafter, BTS stations), such as the BTS station 110.

According to an embodiment, the BTS station 110 provides radio coverage over a geographic area 115 (also referred to as cell).

According to an embodiment, the BTS stations, including the BTS station 110, form the radio access network. According to an embodiment, the radio access network is communicably coupled to a core network (not shown). According to an embodiment, the core network is coupled to external networks (not shown), such as the Internet and/or public switched telephone networks.

According to an embodiment, the BTS station 110 comprises a transmitter apparatus (not shown) configured to generate and transmit electromagnetic signals in the radio domain (hereinafter, radio signals), and a receiver apparatus (not shown) configured to receive and process the radio signals.

According to an embodiment, the transmitter apparatus is configured to generate and transmit the radio signals both in the form of electromagnetic waves (i.e., periodic electromagnetic signals whose waveform depends on BTS station technology) and in the form of electromagnetic pulses. According to an embodiment, each electromagnetic pulse has a pulse duration short or relatively short in time (or, equivalently, a pulse bandwidth high or relatively high in frequency). According to an embodiment, the pulse bandwidth depends on a desired spatial resolution. Just as an example, for the purposes of the present disclosure, the pulse bandwidth of the electromagnetic pulse may range from 100 MHz (e.g., so as to obtain a spatial resolution of about 2.5 m) to 2 GHz (e.g. so as to obtain a spatial resolution of about 12 cm). Additionally, or alternatively, the pulse bandwidth may depend on a bandwidth available at the transmitter apparatus.

According to an embodiment, the receiver apparatus is configured to receive and process the radio signals both in the form of electromagnetic waves and in the form of electromagnetic pulses.

As better discussed in the following, according to an embodiment, transmission and reception of the radio signal in the form of electromagnetic pulses takes place when using the BTS station to generate electromagnetic images or maps of the geographic area.

According to an embodiment, the receiver apparatus is co-located with the transmitter apparatus.

According to an embodiment, the BTS station 110 comprises an antenna arrangement, not shown. According to an embodiment, the antenna arrangement comprises a transmitting antenna (or more thereof) and a receiving antenna (or more thereof). According to an embodiment, the transmitter apparatus comprises the transmitting antenna for radio signal transmission, and the receiver apparatus comprises the receiving antenna for radio signal reception.

The antenna arrangement is not limiting for the present invention.

According to an embodiment, the antenna arrangement comprises one or more antennas capable of steering the radio signals in a plurality of pointing directions in the geographic area 115 (beam steering functionality)—however, the principles of the present invention equivalently apply to any antenna arrangement, such as an antenna arrangement implementing no beam steering functionality.

According to an embodiment, the antenna arrangement may comprise MIMO ("Multiple Input and Multiple Output")-based multiple antennas, SU-MIMO ("Single User-MIMO")-based multiple antennas, and/or MU-MIMO ("Multi User-MIMO")-based multiple antennas.

According to an embodiment, the antenna arrangement comprises a time variant active antenna.

According to an embodiment, each pointing direction is defined by azimuthal and elevation angle coordinates, with respect to a coordinate system associated with the antenna arrangement.

According to an embodiment, the BTS station 110 comprises a control apparatus, not shown, for controlling an operation of the BTS station 110 or of parts thereof (such as for controlling one or more parameters of the antenna arrangement).

According to an embodiment, the BTS station 110 allows connectable devices within the geographic area 115 to exchange data traffic (e.g., web browsing, e-mailing, voice, or multimedia data traffic).

According to an embodiment, the connectable devices comprise computing devices having connection capabilities to the mobile communication network 105. Examples of connectable devices comprise, but are not limited to, user devices (such as mobile phones, smartphones, tablets, personal digital assistants (PDAs), or laptop computers), and autonomous vehicles (such as self-driving cars or self-driving trucks).

According to a common scenario depicted in the figure, the geographic area 115 covered by the BTS station 110 encloses a plurality of bodies. For the purposes of the present disclosure, a body is a physical object with mass. Examples of bodies include, but are not limited to, living beings (such as persons, animals and trees) and inanimate objects (such as buildings and vehicles).

According to an embodiment, the plurality of bodies within the geographic area 115 comprise bodies whose presence within the geographic area 115 is permanent (or substantially permanent), hereinafter permanent bodies, and bodies whose presence within the geographic area 115 is temporary, hereinafter temporary bodies.

For the purposes of the present disclosure, a permanent body is a body that is stably located within the geographic area 115 for long or relatively long times (e.g., of the order of days, months, years or decades). According to an embodiment, a permanent body may comprise a living being (such as a tree) or an inanimate object (such as a building). For the purposes of the present disclosure, the arrangement of the permanent bodies within the geographic area 115 identifies an environmental layout of the geographic area 115.

For the purposes of the present disclosure, a temporary body is a body that is temporarily at the geographic area 115. According to an embodiment, a temporary body may comprise a living being (such as a person or an animal) or an inanimate object (such as a vehicle). According to an embodiment, the temporary body may be a body external to the geographic area 115, and that has temporarily accessed the geographic area 115. According to an embodiment, the temporary body may be a fixed body, i.e. a body that statically maintains its position (zero speed) for minutes or hours (such as a parked vehicle) or for seconds (such as a vehicle stopped at a traffic light), or a moving body, i.e. a body that changes its position (non-zero speed) at each time instant (such as a travelling vehicle or a walking person).

According to an embodiment, the system 100 is configured to implement a method (hereinafter, estimate method) for estimating the occupancy level of the geographic area 115. For the purposes of the present disclosure, as better understood from the following discussion, by occupancy level of the geographic area it is meant the level of presence of the temporary bodies within that geographic area.

According to an embodiment, the system 100 comprises an estimate module 120 configured to implement the estimate method.

According to an embodiment, the estimate module 120 is configured to implement the estimate method by cooperation with the BTS station 110 (as conceptually represented in the figure by arrow connection between the BTS station 110 and the estimate module 120).

According to an embodiment, the estimate module 120 is implemented by software, hardware, and/or a combination thereof.

According to an embodiment, the estimate module 120 is physically or logically located, at least partially, within the mobile communication network 105, the estimate module 120 being for example physically or logically located within one or more entities of the mobile communication network 105. According to an embodiment, the estimate module 120 is physically or logically located, at least partially, within a network management entity (not shown) of the mobile communication network 105.

According to an embodiment, the estimate module 120 is physically or logically located, at least partially, within the BTS station 110. According to an embodiment, the estimate module 120 is physically or logically located, at least partially, within the control apparatus of the BTS station 110.

Figure 2:
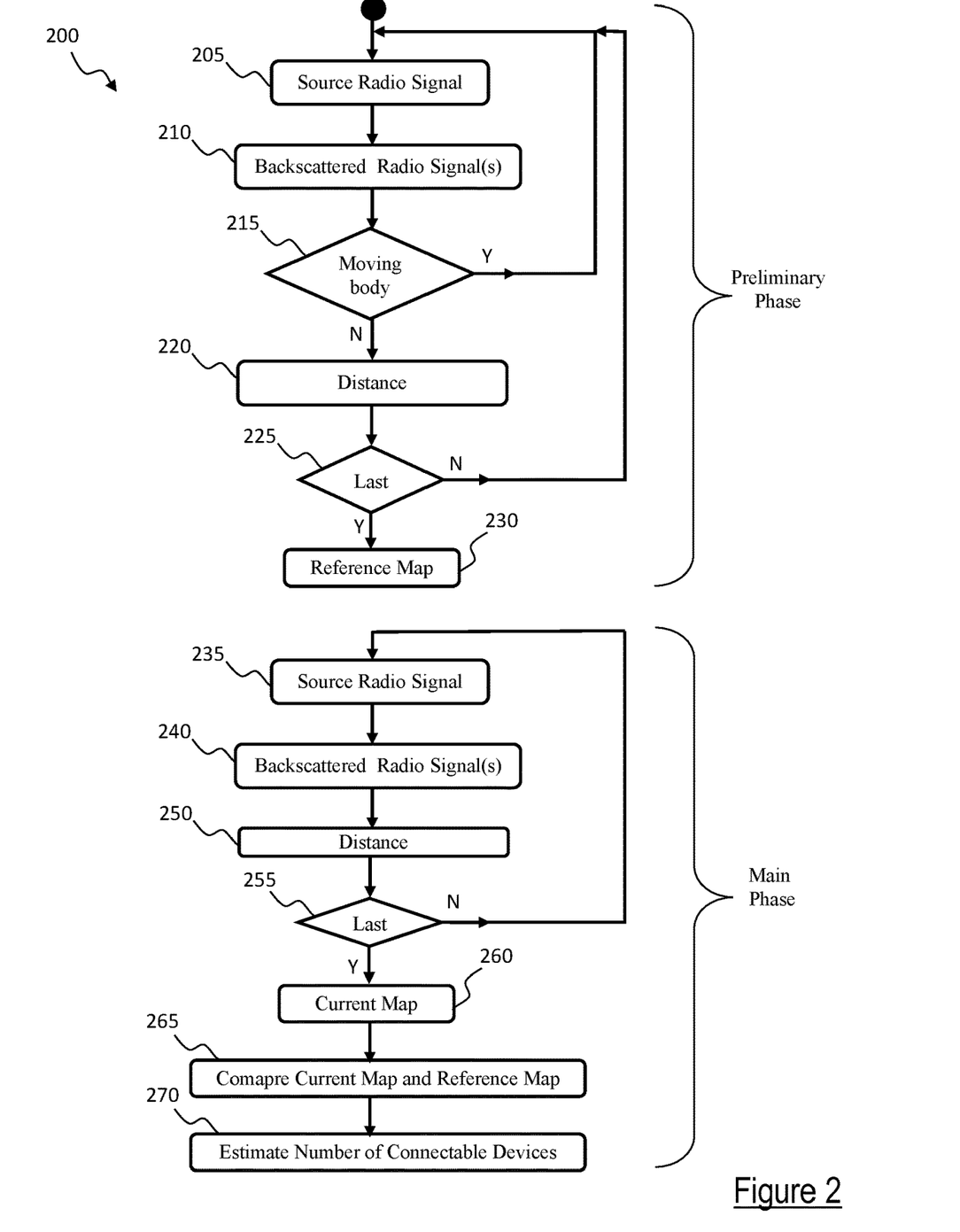
FIG. 2 shows an activity diagram of a method according to an embodiment of the present invention.

FIG. 2 shows an activity diagram of an estimate method 200 according to an embodiment of the present invention.

According to an embodiment, the estimate method 200 is based on monostatic radar principles. According to monostatic radar principles, radio signals (hereinafter, source radio signals) are generated and transmitted (by the transmitter apparatus) over the geographic area 115, and corresponding radio signals (hereinafter, backscattered radio signals) originated from the plurality of bodies within the geographic area 115 by backscattering of the source radio signals hitting the plurality of bodies are received (by the receiver apparatus, co-located with the transmitter apparatus), so as to get information about location and speed of the bodies and generate a corresponding electromagnetic image (or map).

Broadly speaking, according to an embodiment the estimate method 200 comprises:

a first phase (hereinafter, preliminary phase), performed during a reference time period, aimed at generating an electromagnetic image or map of the geographic area without (or essentially without) temporary bodies (hereinafter, reference map) (nodes 205-230), and a second phase (hereinafter, main phase), performed at the specified time period (following in time the reference time period), aimed at determining an electromagnetic image or map of the geographic area with the plurality of bodies currently occupying it (hereinafter, current map), and estimating the occupancy level of the geographic area (i.e., the number of temporary bodies) at that specified time period based on (e.g., a comparison between) the current map and the reference map (nodes 235-270).

According to an embodiment, the estimate method 200 (or at least the preliminary phase or the main phase thereof) is performed periodically.

According to an embodiment, the estimate method 200 (or at least the preliminary phase or the main phase thereof) is performed aperiodically, e.g. when radio resources not occupied in providing services are available at the BTS station and/or when specific needs (such as emergency situations) arise.

According to an embodiment, the estimate method 200 may be performed on both a periodic and aperiodic basis: just as an example, the preliminary phase may be performed periodically (in order to continuously update the reference map) and the main phase may be performed aperiodically, e.g. when required.

According to an embodiment, the reference time period (during which the preliminary phase of the estimate method 200 is performed) is a time period wherein data traffic within the geographic area 115 is below a data traffic threshold. According to an embodiment, the reference time period (during which the preliminary phase of the estimate method 200 is performed) is a time period wherein data traffic within the geographic area 115 is minimum.

Just as an example, the reference time period may be a time period of minutes within one or more daily hours, a time period of hours (or fractions thereof) within one or more days, or a time period of days (or fractions thereof) within one or more weeks or months (or fractions thereof).

According to an embodiment, the reference time period may be determined according to one or more assumptions about the geographic area 115 and/or uses thereof. Just as an example, the reference time period may fall within night hours, where in most scenarios a reduced occupancy level of the geographic area 115 could be reasonably expected or assumed.

According to an embodiment, the reference time period may be determined according to base transceiver station activity counters (or, more generally, according to one or more monitoring/tracking modules aimed at monitoring/tracking the activity of the BTS station 110 and allowing to correspondingly quantifying it): this could be the case of, for example, a BTS station (such as the BTS station 110) installed in the geographic area 115 since at least a minimum time period (e.g., a time period long enough to give statistic relevance to activity counting).

According to an embodiment, the reference time period may be determined according to base transceiver station activity estimates: this could be the case of, for example, a BTS station (such as the BTS station 110) not installed in the geographic area 115 since at least the minimum time period, whereby no statistic relevance could yet arise from any activity counting.

According to an embodiment, the source radio signals comprise a succession of source radio signals. According to an embodiment, each source radio signal of the succession of radio signal has a respective pointing direction (i.e., a direction defined by respective azimuthal and elevation angle coordinates).

According to an embodiment, each source radio signal comprises an electromagnetic pulse.

According to an embodiment, each source radio signal comprises a perfect autocorrelation sequence of electromagnetic pulses (i.e., a complex periodic sequence of electromagnetic pulses such that all the out-of-phase autocorrelation coefficients are zero), or an almost perfect autocorrelation sequence of electromagnetic pulses (i.e., a complex periodic sequence of electromagnetic pulses such that all the out-of-phase autocorrelation coefficients are zero except one).

According to an embodiment, the estimate method 200 (i.e., the preliminary phase thereof) comprises causing the BTS station 110 to transmit a source radio signal of the succession of source radio signals (action node 205).

According to an embodiment, transmission of the source radio signal can take place according to TDD ("Time Division Duplex") technique.

According to an embodiment, transmission of the source radio signal can take place according to FDD ("Frequency Division Duplex") technique.

According to an embodiment, the estimate method 200 (i.e., the preliminary phase thereof) comprises causing the BTS station 110 (i.e. the receiver apparatus thereof, particularly the receiving antenna) to receive a corresponding backscattered radio signal (or more thereof) originated from a body within the geographic area 115 by backscattering of the (transmitted) source radio signal hitting that body (action node 210).

According to an embodiment, the BTS station 110 is configured to associate the (received) backscattered radio signal with a respective one of the pointing directions. In the following, a backscattered radio signal along a pointing direction will denote a backscattered radio signal whose actual direction of reception at the BTS station 110 is "approximated" to the pointing direction that better approaches it (irrespective of the pointing direction along which the respective source radio signal has been transmitted).

As it should be understood, in case of an antenna arrangement implementing no beam steering functionality, no association of a (received) backscattered radio signal to a respective pointing direction is performed (in which case the resulting reference and current maps could lack of the direction information, without essentially affecting the possibility of estimating the occupancy level of the geographic area).

According to an embodiment, the estimate method 200 (i.e., the preliminary phase thereof) comprises determining a distance information indicative of a distance of the body from the BTS station 110 (action node 220). According to an embodiment, the distance information is determined based on one or more radio signal parameters. According to an embodiment, the radio signal parameter(s) comprises a time delay between the (transmitted) source radio signal and the (received) backscattered radio signal. According to an embodiment, the radio signal parameter(s) further comprises an amplitude of the (received) backscattered radio signal (or an attenuation coefficient indicative of a ratio between the amplitude the backscattered radio signal and the amplitude of the respective (transmitted) source radio signal).

According to an embodiment, when the source radio signal (and, hence, the corresponding backscattered radio signal) comprises a perfect or an almost perfect autocorrelation sequence of electromagnetic pulses, the radio signal parameters (or at least a subset thereof) may be determined based on a cross correlation between that source radio signal and the corresponding backscattered radio signal(s).

According to an embodiment, the radio signal parameters (or at least a subset thereof) are determined at the BTS station 110. According to an embodiment, the radio signal parameters (or at least a subset thereof) are determined at the BTS station 110 by exploiting processing capabilities of the corresponding receiver apparatus.

According to an embodiment, the radio signal parameters (or at least a subset thereof) are determined at the estimate module 120.

According to an embodiment, the distance information is determined at the estimate module 120. According to an embodiment, the distance information is determined at the estimate module 120 upon reception of the radio signal parameters.

According to an embodiment, the estimate method 200 (i.e., the preliminary phase thereof) comprises reiterating the steps of nodes 205 to 220 for each source radio signal of the succession of source radio signals. This is conceptually represented in the figure by loop connection between a decision node 225 and an action node 205.

According to an embodiment, if the source radio signal transmitted at a current iteration is not the last source radio signal of the succession of source radio signals (exit branch N of the decision node 225), then nodes 205 to 220 are repeated as such for each following source radio signal of the succession of source radio signals.

According to an embodiment, if the source radio signal transmitted at the current iteration is the last source radio signal of the succession of source radio signals (exit branch Y of the decision node 225), the reference map is generated (action node 230) according to the source radio signals and the corresponding backscattered radio signals (particularly, according to the pointing directions of the source radio signals and to the distance information determined based on the corresponding backscattered radio signals).

According to an embodiment, the reference map is generated at the estimate module 120 upon reception of the pointing directions of the source radio signals and of the distance information determined based on the corresponding backscattered radio signals.

According to an embodiment, not shown, the reference map is generated progressively as the backscattered radio signal (or each backscattered radio signal) associated with a respective (transmitted) source radio signal is received.

Figure 3A:
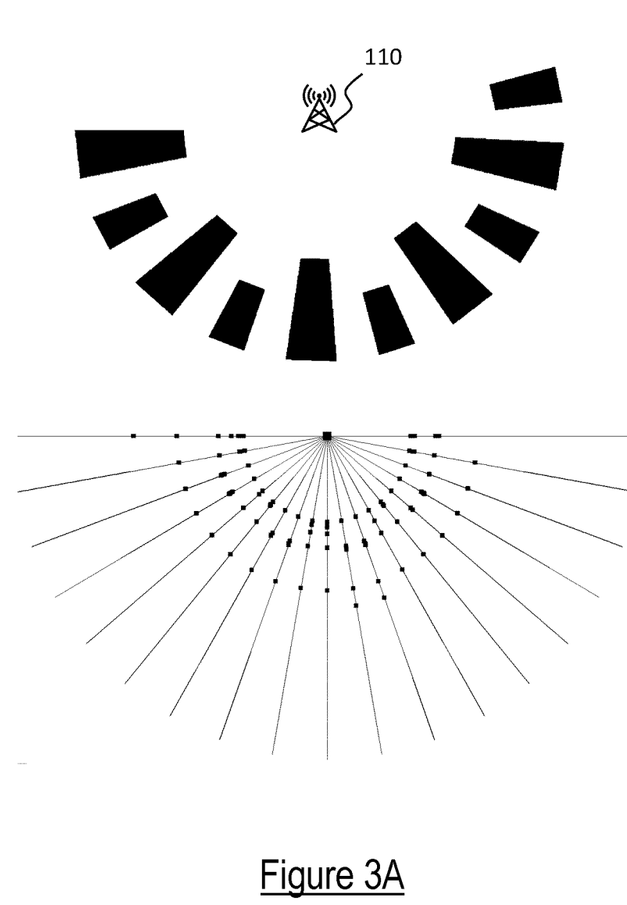
FIGS. 3A and 3B schematically show, each one, an exemplary environmental layout of a geographic area without temporary bodies therein, and a respective electromagnetic map, according to an embodiment of the present invention.
Figure 3B:
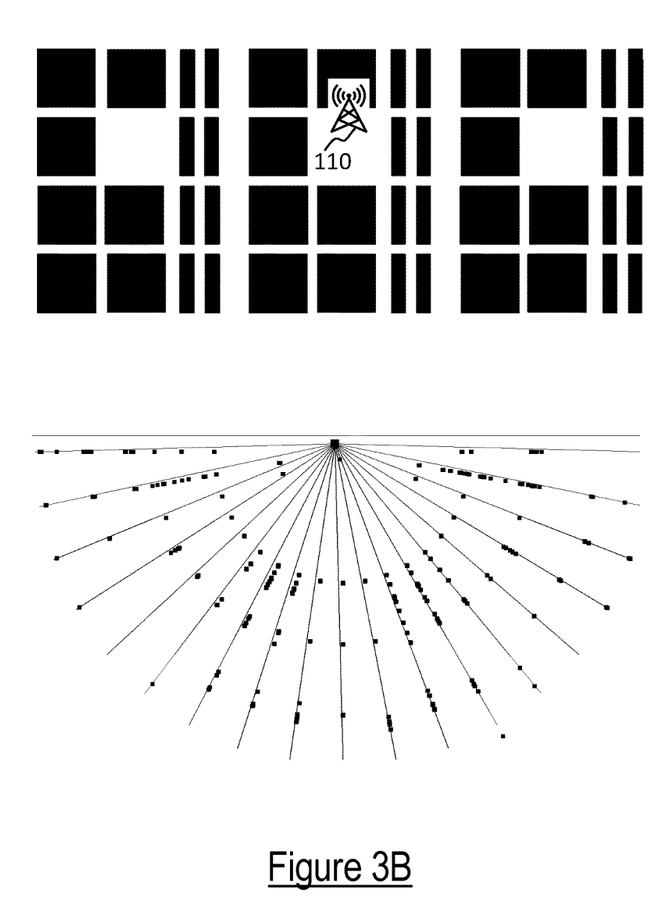

Exemplary reference maps that can be obtained during the preliminary phase of the estimate method 200 are illustrated in FIGS. 3A and 3B for different environmental layouts of the geographic area, with no temporary bodies within the geographic area. Particularly, FIGS. 3A and 3B schematically show, on the top, a plaza layout and a (urban) canyon layout, respectively, wherein each block corresponds to a permanent body, and, on the bottom, the respective reference map.

According to an embodiment, the reference map comprises a plurality of lines (hereinafter, direction lines) radially extending from the BTS station 110 (i.e., the BTS station 110 representing the centre of the lines). According to an embodiment each direction line represents a respective pointing direction along which one or more backscattered radio signals are received.

According to an embodiment, each reference map comprises, on each direction line, one or more marks (e.g., dots) each one representing an interaction point (between a source radio signal and a body) that has originated a corresponding backscattered radio signal received by the BTS station 110 along the pointing direction corresponding to that direction line.

According to an embodiment, each mark is placed along the direction line at a distance from the centre depending on a delay time between the reception of the backscattered radio signal and the transmission of the respective source radio signal. According to an embodiment, each mark is placed along the direction line at a distance from the centre that increases as the delay time increases.

According to an embodiment, each value of delay time along a direction line is associated with a respective distance information.

Since the (received) backscattered radio signals may have propagated along a LoS ("Line-of-Sight") propation path or along a NLoS ("Non-Line-of-Sight") propagation path, multiple marks on a same pointing direction do not necessarily indicate that the corresponding bodies are located in that pointing direction (along a LoS propagation path), rather they indicate that the backscattered radio signals have been received along that pointing direction. Similarly, adjacent or close marks on a same pointing direction do not necessarily indicate that the corresponding bodies are close to each other, rather they indicate that the bodies are at such a distance from the BTS station 110 and at such a position within the geographic area 115, that backscattered radio signals originated by them are received at the BTS station 110 with almost the same delay time (with respect to the respective source radio signals).

Therefore, according to the considered embodiment, each mark along a direction line represents an "equivalent" position of the corresponding body along that direction line, and, hence, the distance between that mark and the centre represents an "equivalent" distance of the corresponding body from the BTS station 110.

According to an embodiment, the estimate method 200 (i.e., the preliminary phase thereof) comprises identifying, among the backscattered radio signals, the backscattered radio signals originated from the temporary bodies, and generating the reference map by discarding (i.e., disregarding) the backscattered radio signals originated from the temporary bodies (as discussed here below).

According to an embodiment, upon reception of the backscattered radio signal originated from a body within the geographic area 115 by backscattering of the (transmitted) source radio signal hitting that body (action node 210), the estimate method (i.e., the preliminary phase thereof) 200 comprises checking whether such a backscattered radio signal has been originated from a temporary body (decision node 215).

According to an embodiment, the backscattered radio signal is identified as a backscattered radio signal originated by a temporary body based on a detection of a Doppler shift between the backscattered radio signal and the corresponding (transmitted) source radio signal (hence, the backscattered radio signal is identified as a backscattered radio signal originated by a permanent body based on no detection of a Doppler shift between the backscattered radio signal and the corresponding (transmitted) source radio signal).

According to an embodiment, when the source radio signal (and, hence, the corresponding backscattered radio signal) comprises a perfect or an almost perfect autocorrelation sequence of electromagnetic pulses, a Doppler shift between the backscattered radio signal and the corresponding (transmitted) source radio signal may be determined based on a cross correlation between that source radio signal and the corresponding backscattered radio signal.

According to an embodiment, if the backscattered radio signal is identified as a backscattered radio signal originated by a temporary body (exit branch Y of the decision node 215), the estimate method 200 (i.e., the preliminary phase thereof) comprises discarding the backscattered radio signal of the current iteration (whereby no distance information is determined for the temporary bodies and no temporary body is mapped onto the reference map), and reiterating nodes 205 to 225 for each source radio signal of the succession of source radio signals (as conceptually represented in the figure by loop connection between the exit branch Y of the decision node 225 and action node 205).

According to an embodiment, if the backscattered radio signal is identified as a backscattered radio signal originated by a permanent body (exit branch N of the decision node 215), the estimate method 200 (i.e., the preliminary phase thereof) comprises, as discussed above, determining the distance information (action node 220) and, upon reiterating nodes 205 to 225 for each source radio signal of the succession of source radio signals, generating the reference map (action node 230).

Therefore, the reference map so obtained is a map of the permanent bodies, among the plurality of bodies, within the geographic area 115.

It should be pointed out that, in practical cases, each geographic area may be affected by respective conditions of temporary bodies, and by different predictability levels thereof. Taking it into account, the embodiment in which the backscattered radio signals are discriminated between backscattered radio signals originated by temporary bodies and backscattered radio signals originated by permanent bodies, and the backscattered radio signals originated by temporary bodies are discarded in order to generate a reference map without or essentially without temporary bodies (i.e. including only or almost only the permanent bodies) may be advantageous in scenarios in which during the reference time period (regardless of being a reference time period determined according to one or more assumptions about the geographic area and/or uses thereof, and/or a reference time period determined according to base transceiver station activity counters, and/or a reference time period determined according to base transceiver station activity estimates) a non-negligible and/or unpredictable number of temporary bodies is expected to be within the geographic area, or may be omitted in scenarios in which, during the reference time period, no or essentially no temporary bodies are expected to be within the geographic area.

According to an embodiment, not shown, the estimate method 200 (i.e., the preliminary phase thereof) comprises repeating nodes 205 to 230 for one or more repetitions, e.g. so as to obtain, at each repetition, a refinement of the reference map. According to an embodiment, at each current repetition, the estimate method 200 (i.e., the preliminary phase thereof) comprises removing from the (new) reference map generated at the current repetition any permanent bodies that were not present in the reference map generated at a previous repetition before the current repetition. This allows progressively refining the reference map: on the one hand the current repetition of the reference map updates the reference map in that it does not comprise any bodies that are not visible in the current repetition (although they were previously identified, wrongly, as permanent bodies, being present in the previous repetition); on the other hand, the removal of any bodies that are now present, although they were not present in the reference map generated at a previous repetition before the current repetition, allows identifying these now present bodies as temporary bodies, keeping them excluded from the reference map).

According to an embodiment, the method may comprise including these now present bodies as (new) permanent bodies of the reference map if these bodies are still detected after a predetermined number of repetitions.

As mentioned above, according to an embodiment, the main phase of the estimate method 200 is performed during a specified time period, i.e. the time period for which the map of the plurality of permanent and temporary bodies currently occupying the geographic area 115 (current map) is generated, in order to accordingly estimate the occupancy level of the geographic area 115 at that specified time period.

According to an embodiment, the estimate method 200 (i.e., the main phase thereof) comprises causing the BTS station 110 to transmit a source radio signal of the succession of source radio signals (action node 235), causing the BTS station 110 (i.e. the receiver apparatus thereof, particularly the receiving antenna) to receive the backscattered radio signal originated from a body within the geographic area 115 by backscattering of the (transmitted) source radio signal hitting that body (action node 240), determining a distance information indicative of a distance of the body from the BTS station 110 (action node 250), and reiterating nodes 235 to 250 for each source radio signal of the succession of source radio signals (as conceptually represented in the figure by loop connection between the decision node 255 and the action node 235).

According to an embodiment, the action nodes 235, 240, 250 and the decision node 255 performed during the main phase of the estimate method 200 are analogous, respectively, to the action nodes 205, 210, 220 and the decision node 225 performed during the preliminary phase of the estimate method 200, and they will not be discussed again for the sake of conciseness (it being understood that any features, variants and/or implementation aspects discussed above in connection with the nodes 205, 210, 220 and 225 equivalently apply, totally or partially, to the nodes 235, 240, 250 and 255, respectively).

According to an embodiment, the estimate method 200 (i.e., the main phase thereof) comprises generating the current map of the plurality of bodies (currently) within the geographic area 115 (action node 260).

According to an embodiment, the current map is generated according to the source radio signals and the corresponding backscattered radio signals (particularly, according to the pointing directions of the source radio signals and to the distance information determined based on the corresponding backscattered radio signals).

According to an embodiment, the current map is generated at the estimate module 120 upon reception of the pointing directions of the source radio signals and of the distance information determined based on the corresponding backscattered radio signals.

According to an embodiment, not shown, the current map is generated progressively as the backscattered radio signal associated with a respective (transmitted) source radio signal is received.

The generation of the current map (action node 260) is conceptually analogous to the generation of the reference map (action node 230), however the reference and current maps identify different occupancy scenarios of the geographic area 115: the reference map identifies a static occupancy scenario with no or essentially no temporary bodies (or, equivalently, with only or essentially only permanent bodies) within the geographic area (in that, as discussed above, the backscattered radio signals originated from the temporary bodies are not used for the generation of the reference map and/or in that the reference time period during which the reference map is generated is such that no or substantially no temporary bodies are within the geographic area), whereas the current map identifies a dynamic, real-time occupancy scenario with all the permanent and temporary bodies actually within the geographic area. In other words, the current map may be regarded as a perturbation of a reference scenario described by the reference map.

Figure 4A:
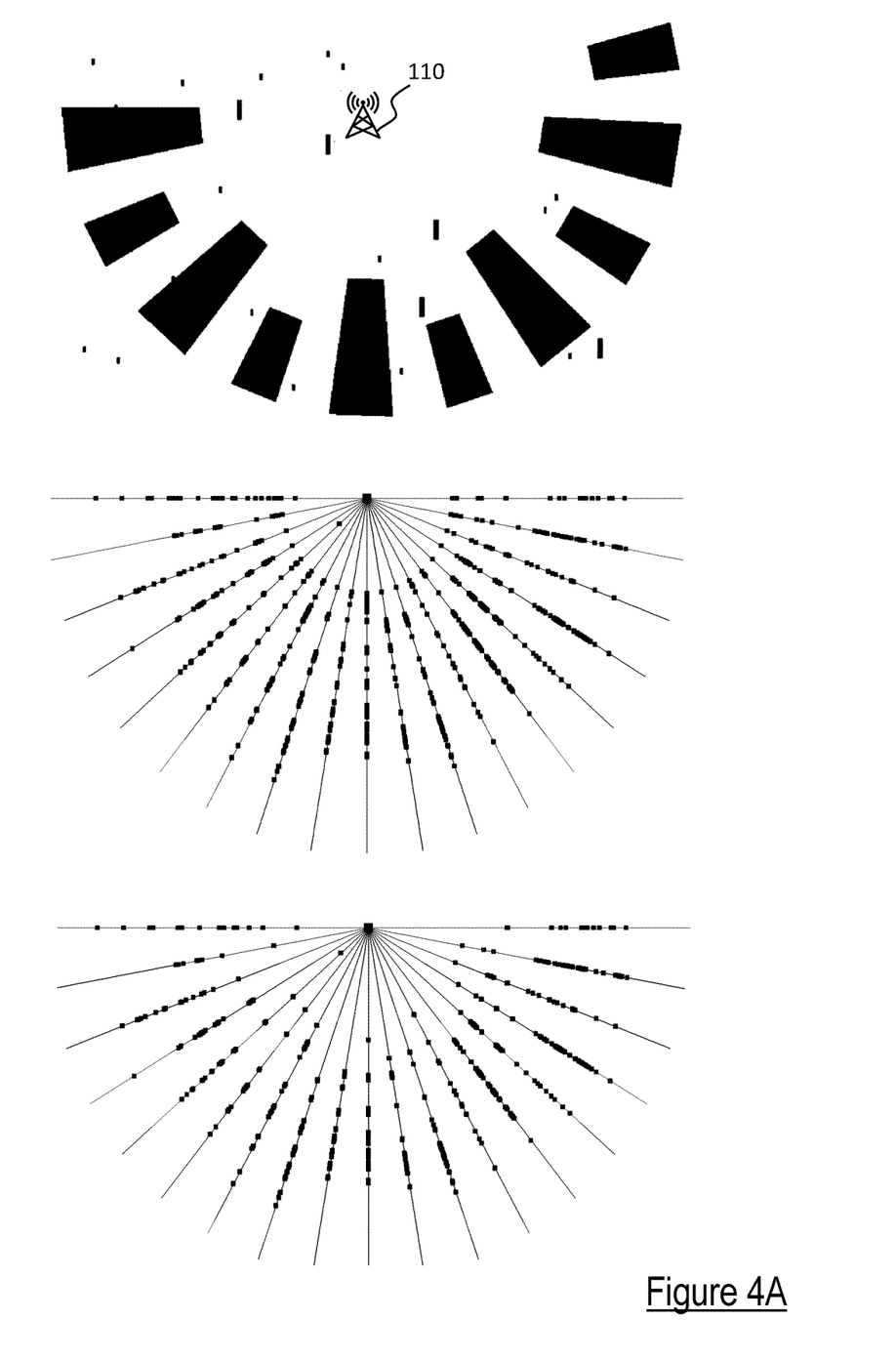
FIGS. 4A and 5A schematically show, according to respective embodiments of the present invention, the exemplary environmental layout of FIG. 3A with temporary bodies within the geographic area, and respective electromagnetic maps at different steps of the method, and FIGS. 4B and 5B schematically show, according to respective embodiments of the present invention, the exemplary environmental layout of FIG. 3B with temporary bodies within the geographic area, and respective electromagnetic maps at different steps of the method.
Figure 4B:
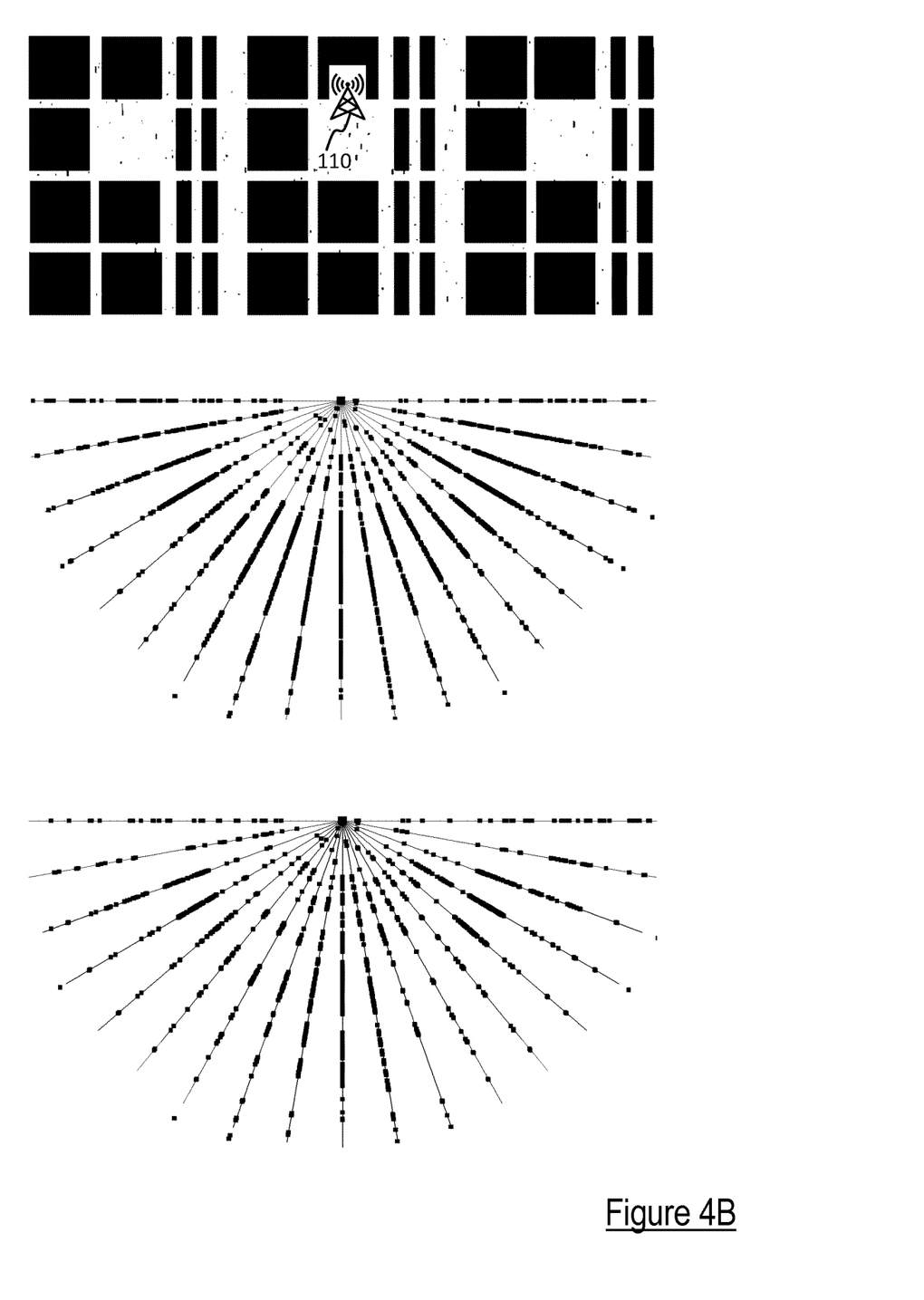
Figure 5A:
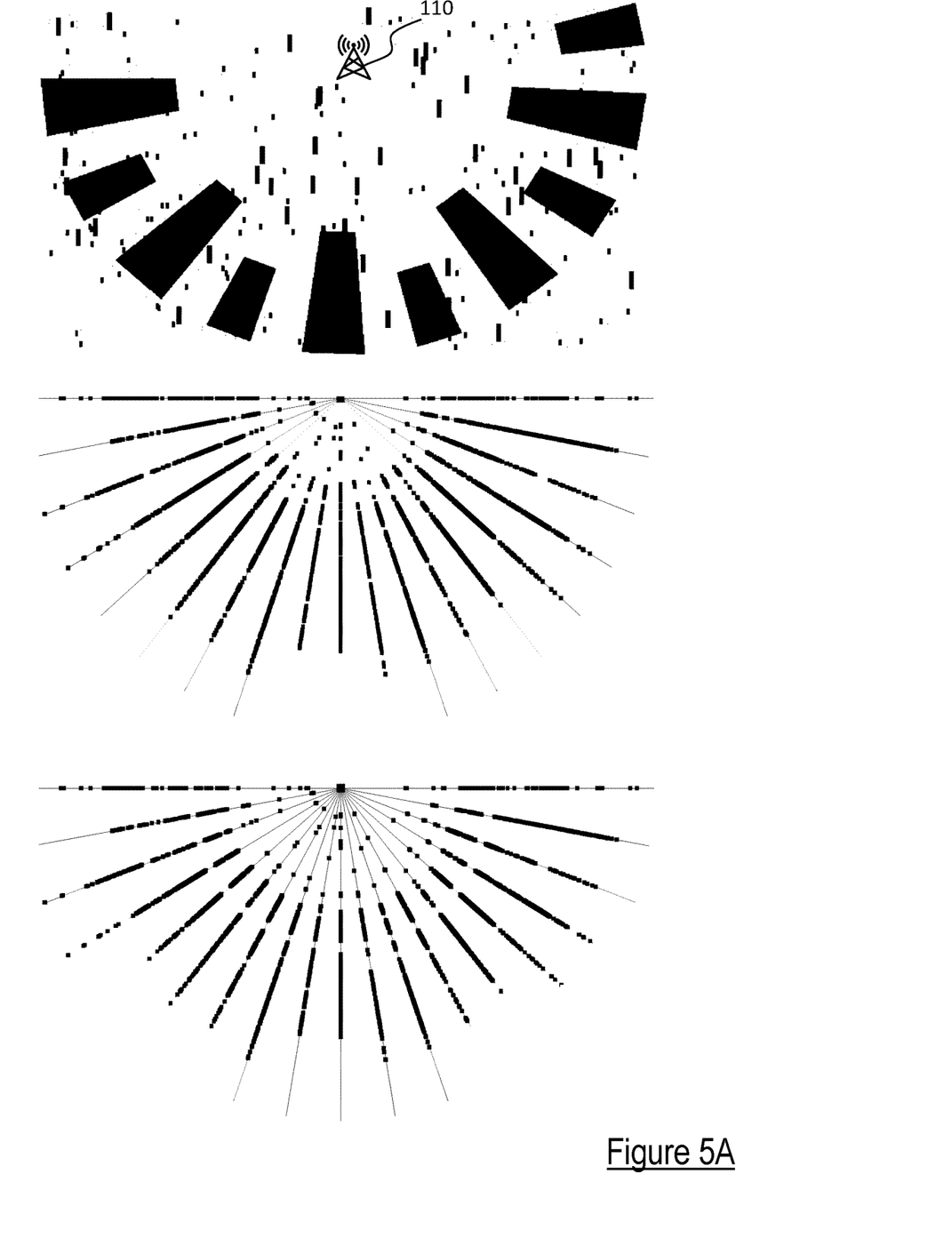
Figure 5B:
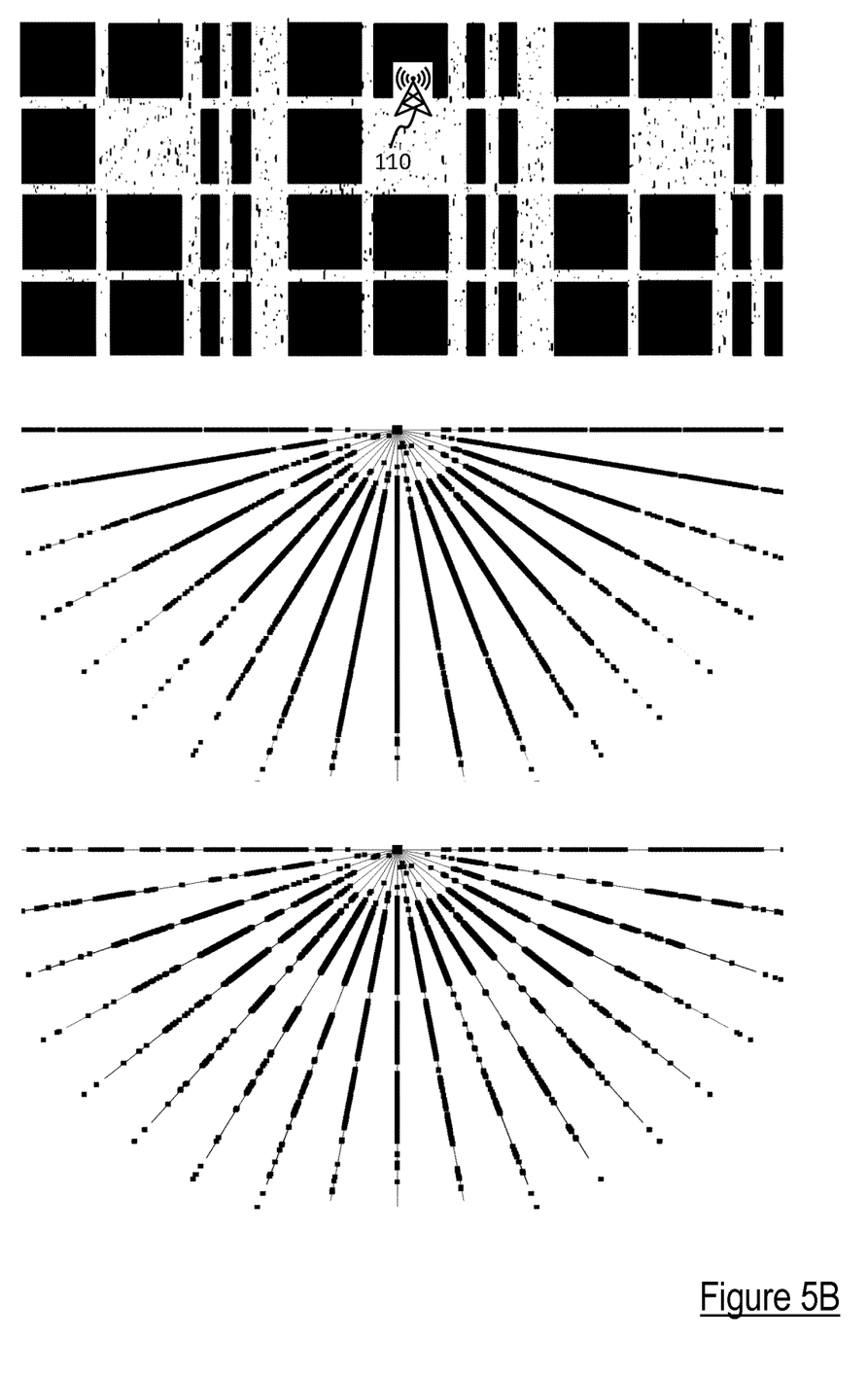

Exemplary currents maps that can be obtained during the main phase of the estimate method 200 are illustrated in FIGS. 4A and 5A for the environmental layout of FIG. 3A, and in FIGS. 4B and 5B for the environmental layout of FIG. 3B. Particularly, each of the FIGS. 4A and 5A schematically shows, on the top, the plaza layout and a number of temporary bodies (the moving bodies being represented by vertical bars with different sizes), and, in the middle, the respective current map, and each of the FIGS. 4B and 5B schematically shows, on the top, the canyon layout and a number of temporary bodies (the temporary bodies being represented by vertical bars with different sizes), and, in the middle, the respective current map.

According to an embodiment, the current map is conceptually analogous to the reference map, i.e. it comprises a plurality of direction lines radially extending from the BTS station 110 and representing each one a respective pointing direction along which one or more backscattered radio signals are received, and, on each direction line, one or more marks (e.g., dots) each one representing an interaction point and placed along the direction line at a distance from the centre depending on a delay time between the reception of a backscattered radio signal and the transmission of the respective source radio signal.

According to an embodiment, the estimate method 200 (i.e., the main phase thereof) comprises determining a number of temporary bodies within the geographic area 115 during the specified time period according to a comparison between the current map and the reference map (action node 265).

According to an embodiment, said comparison between the current map and the reference map comprises determining a difference between the current map and the reference map. According to an embodiment, the difference between the current map and the reference map is based on an image differencing technique (or any other image processing technique used to determine changes between images, such as the image processing techniques disclosed in R. J. Radke; S. Andra; O. Al-Kofahi; B. Roysam "*Image change detection algorithms: a systematic survey*", IEEE Transactions on Image Processing (Volume: 14, Issue: 3, March 2005).

According to an embodiment, said comparison between the current map and the reference map comprises generating a map (hereinafter, difference map) indicative of the difference between the current map and the reference map.

Exemplary difference maps that can be obtained during the main phase of the estimate method 200 are illustrated in the bottom of FIGS. 4A and 5A for the environmental layout of FIG. 3A, and in the bottom of FIGS. 4B and 5B for the environmental layout of FIG. 3B.

As it should be understood, according to the considered embodiment, in each difference map each mark indicates a respective temporary body, whereby the number of temporary bodies within the geographic area 115, which is indicative of the occupancy level of that geographic area, may be determined based on the difference map.

Thanks to the present invention, the estimate of the occupancy level of the geographic area takes into account the level of presence of temporary bodies in the practical case in which the bodies include persons, living beings other than persons, and inanimate objects, and is independent from the network operator to which the users have subscribed.

A practical example of the use of the occupancy level of the geographic area 115 determined by the estimate method 200 comprises estimating, according to the occupancy level of the geographic area 115 (and, particularly, according to the number of temporary bodies within the geographic area 115), a number of connectable devices within the geographic area 115 that may connect to the mobile communication network 105 (action node 270).

According to an embodiment, the number of connectable devices that may connect to the mobile communication network 105 is computed from the number of temporary bodies within the geographic area 115 according to one or more criteria.

Just as an example, the number of connectable devices that may connect to the mobile communication network 105 may be computed as a predetermined percentage of the number of temporary bodies within the geographic area 115. The predetermined percentage may for example be computed based on statistical and/or historical information about the spread or availability of connectable devices within the geographic area 115 (such as the spread or availability of autonomous vehicles), and/or on user profiling information (such as average number of connectable devices each user usually carries with him/her).

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. A method for estimating, at a specified time period, an occupancy level of a geographic area served by a mobile communication network, wherein the mobile communication network comprises a base transceiver station providing radio coverage over the geographic area, the method comprising:

during a reference time period:
a) causing the base transceiver station to transmit first radio signals over the geographic area, and to receive corresponding second radio signals originated from a plurality of bodies within the geographic area by backscattering of the first radio signals hitting the plurality of bodies, wherein the plurality of bodies comprise first bodies whose presence within the geographic area is permanent and second bodies whose presence within the geographic area is temporary;
b) according to the first and second radio signals, generating a first map of the first bodies within the geographic area, wherein, during the reference time period:
the method further comprises, after step a), identifying, among the second radio signals, the second radio signals originated from the second bodies, and
step b) is performed by discarding the second radio signals originated from the second bodies;
and wherein the method comprises, at the specified time period, following in time the reference time period:
c) performing step a);
d) according to the first and second radio signals, generating a second map of the plurality of bodies within the geographic area;
e) according to a comparison between the first and second maps, determining a number of the second bodies within the geographic area during the specified time period, said number of second bodies representing said occupancy level.

2. The method according to claim 1, wherein said identifying, among the second radio signals, the second radio signals originated from the second bodies is based on a detection of a Doppler shift between the second radio signals and the respective first radio signals.

3. The method according to claim 1, wherein steps b) and d) are performed based on a time delay between transmission of the first radio signals and reception of the corresponding second radio signals.

4. The method according to claim 3, wherein at least one of the Doppler shift and the time delay is determined based on a cross correlation between the second signals and the respective first signals.

5. The method according to claim 1, wherein each of the first radio signals comprises a perfect autocorrelation sequence of electromagnetic pulses or an almost perfect autocorrelation sequence of electromagnetic pulses.

6. The method according to claim 1, further comprising, during the reference time period:
   repeating steps a) and b), and
   at each current repetition, after step b), removing from the first map generated in the current repetition any first bodies that were not present in the first map generated at a previous repetition before the current repetition.

7. The method according to claim 1, wherein the base transceiver station comprises a time variant active antenna.

8. The method according to claim 1, further comprising determining the reference time period as a time period wherein data traffic within the geographic area is below a data traffic threshold according to at least one among:
   one or more assumptions about the geographic area and/or uses thereof;
   base transceiver station activity counters, and
   base transceiver station activity estimates.

9. A system for estimating, at a specified time period, an occupancy level of a geographic area served by a mobile communication network, wherein the mobile communication network comprises a base transceiver station providing radio coverage over the geographic area, the system comprising an estimate module configured to, during a reference time period:
   a) cause the base transceiver station to transmit first radio signals over the geographic area, and to receive corresponding second radio signals originated from a plurality of bodies within the geographic area by backscattering of the first radio signals hitting the plurality of bodies, wherein the plurality of bodies comprise first bodies whose presence within the geographic area is permanent and second bodies whose presence within the geographic area is temporary;
   b) according to the first and second radio signals, generate a first map of the first bodies within the geographic area,
   wherein, during the reference time period: the estimate module is configured to, after step a), identify, among the second radio signals, the second radio signals originated from the second bodies, and step b) is performed by discarding the second radio signals originated from the second bodies;
   and wherein the estimate module is configured to, at the specified time period, following in time the reference time period:
   c) perform step a);
   d) according to the first and second radio signals, generate a second map of the plurality of bodies within the geographic area, and
   e) according to a comparison between the first and second maps, determine a number of the second bodies within the geographic area during the specified time period, said number of second bodies representing said occupancy level.

* * * * *